(Model.)
A. WAKEMAN.
FISHING TACKLE.
No. 303,347. Patented Aug. 12, 1884.
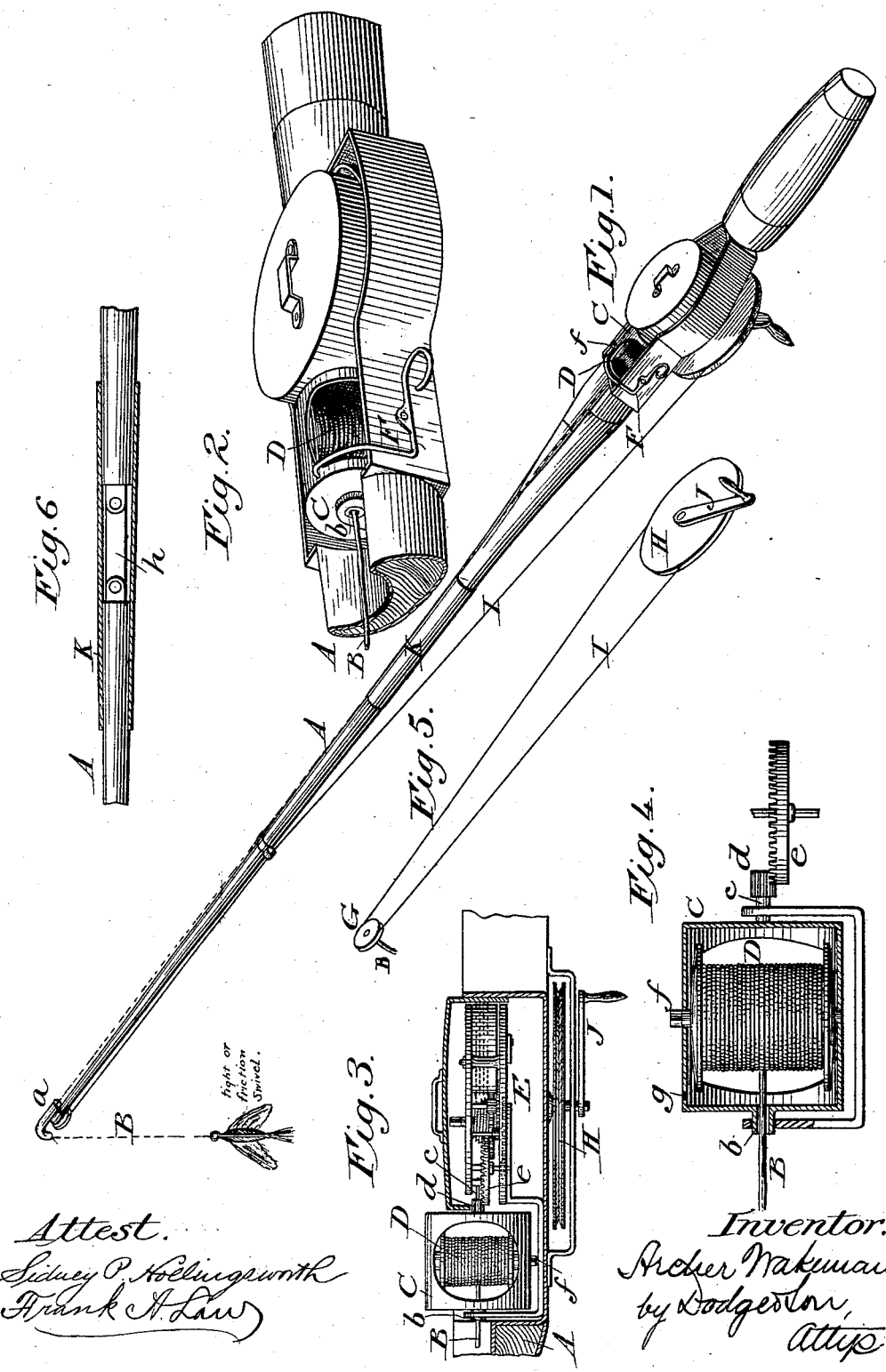
Attest.
Sidney P. Hollingsworth
Frank N. Law
Inventor.
Archer Wakeman,
by Dodge & Son,
Attys.

UNITED STATES PATENT OFFICE.

ARCHER WAKEMAN, OF CAPE VINCENT, NEW YORK.

FISHING-TACKLE.

SPECIFICATION forming part of Letters Patent No. 303,347, dated August 12, 1884.

Application filed December 31, 1881. Renewed July 28, 1883. (Model.)

*To all whom it may concern:*

Be it known that I, ARCHER WAKEMAN, of Cape Vincent, in the county of Jefferson and State of New York, have invented certain Improvements in Fishing-Tackle, of which the following is a specification.

My invention consists in a device to be applied to fishing-lines for the purpose of twirling or rotating the line, and with it or through it the fly or bait at its end. This device consists simply of a rotary disk or head to which the line or gimp is attached, provided with or connected with a crank, or with automatically-operating mechanism, or both, by which the line may be rotated. Ordinarily and by preference the device will be applied to a pole or rod, and may be used in connection with a reel for winding in the line.

In the accompanying drawings, Figure 1 represents a perspective view of a rod provided with my attachment adapted to be operated either by hand or by spring-power; Fig. 2, an enlarged view of the same with the rod broken off; Fig. 3, a sectional view of the automatic operating mechanism; Fig. 4, an enlarged section of the shell or cylinder containing the reel; Fig. 5, a view of the twirling mechanism adapted to be operated by hand; Fig. 6, a sectional view of the rod-joint.

Hitherto it has been customary to employ natural bait or food for "still fishing," and to impart no motion thereto; while for trolling and drifting it has been usual to employ artificial bait provided with inclined or spiral wings or blades, which, acted upon by the water, caused the bait to rotate. Under my plan, however, I rotate the minnow, fly, or bait by imparting a rotary or twirling motion to the line which carries it, the swivel of the bait being made sufficiently tight to prevent rotation therein until a fish is hooked, and resistance thereby offered to the rotation of the bait.

The details of the device may be varied considerably without departing from the spirit of my invention, it being only necessary that a wheel or head capable of rotation adapted to receive the line, and provided with means for producing such rotation, be employed.

Referring now to Figs. 1 and 2 of the drawings, which represent my device in its preferred form, A indicates a rod or pole, at the outer end of which is a tubular eye or guide, a, through which the gimp or line B passes, going thence through suitable eyes or guides back to the point at which the rotating mechanism is located. In the form which I am now describing this mechanism consists of a rotary shell or hollow cylinder, C, carried at its ends by journals, and provided in its interior with a reel, D, the axis of which stands at right angles to the length of the rod. The outer or forward journal, b, of the cylinder or shell C is of tubular form in order that the gimp or line B may pass through it to the reel and be readily wound inward upon the latter. The rear journal, c, of the cylinder or shell carries a pinion, d, which, meshing with a wheel, e, of a spring-driven train, E, causes the rotation of the shell. A brake, F, is provided with which to hold the cylinder or shell against rotation, and the reel is provided with a square stem, f, to receive a handle or key by which to turn it and wind in the line. The brake is arranged to enter a hole or notch, g, in the cylinder or shell C, which hole or notch is so located as to hold or stop the shell with the stem f in proper or convenient position for operation.

The line B, or so much thereof as extends from the reel to and through the tubular guide a, is preferably made of gimp, or of other material having sufficient stiffness to turn without buckling or twisting to any material extent, yet capable of being readily wound upon the reel. The line being provided with the usual fly or bait, and the latter being allowed to hang from the rod and thereby to straighten the line, it will be seen that rotation imparted to the shell or cylinder by the train E will be transmitted to the line B, and through it to the bait or fly.

In some instances it may be preferred to operate the device by hand, which may be conveniently done, as indicated in Fig. 5, by arranging a pulley, G, at the outer end of the rod, and a larger pulley, H, at or near the inner end of the same, and passing a band, I, around the two, the small pulley having the line or gimp B attached at its center, and the larger pulley being furnished with a crank or handle, J, by which to turn it.

If preferred, both forms may be combined, or a clutching device provided by which the train may be connected with or disconnected from the rotary shell, wheel, or other device with which the gimp or cord is connected.

In order that the rod may be shortened and packed without danger of breaking the driving cord or band, or the gimp or line, and without necessitating the detachment of the latter, I prefer to join the sections by links $h$ and give the necessary rigidity to the lengthened rod by means of thimbles or sleeves K sliding over the joint, as shown in Fig. 6.

As stated, the fly or bait is designed to turn with the gimp or line, and its swivel is therefore made to bind or fit more closely than is usual, yet is sufficiently free to turn when a fish is taken, and thereby to avoid tangling the line.

Having thus described my invention, what I claim is—

1. In combination with a fishing line or gimp, provided with a fly or bait, a rotary wheel or body connected with said line or gimp, and serving to impart a rotary or twirling motion thereto.

2. In combination with a fishing-line or gimp, a wheel or body connected therewith, and a spring-driven train connected with said wheel or body and arranged to rotate the same, substantially as and for the purpose set forth.

3. The herein-described device for imparting rotary motion to fishing-bait, consisting of the shell C, having tubular journal $b$, and internal reel, D, and provided with means, substantially such as described, whereby it may be rotated as set forth.

4. In combination with a bait-twirling mechanism, a fly or bait provided with a tight-fitting swivel, such as described, whereby the bait is caused to turn with the line or gimp until resistance is offered, whereupon the friction is overcome and the line or gimp permitted to turn independently of the bait.

ARCHER WAKEMAN.

Witnesses:
P. H. REED,
A. E. HOLLENBECK.